United States Patent [19]
Muscaro et al.

[11] Patent Number: 5,289,739
[45] Date of Patent: Mar. 1, 1994

[54] ENGINE IDLE FUEL CONTROL DURING TRANSMISSION RANGE SHIFTING

[75] Inventors: David C. Muscaro; Larry T. Nitz, both of Troy; Michael R. Witkowski, Sterling Heights, all of Mich.

[73] Assignees: Saturn Corporation, Troy, Mich.; Delco Electronics Corporation, Kokomo, Ind.

[21] Appl. No.: 960,639

[22] Filed: Oct. 14, 1992

[51] Int. Cl.⁵ .................................. B60K 41/10
[52] U.S. Cl. ..................... 74/844; 74/866; 74/857; 74/860
[58] Field of Search ............. 74/844, 857, 858, 860, 74/866; 364/424.1

[56] References Cited

U.S. PATENT DOCUMENTS

| | | | |
|---|---|---|---|
| 4,542,460 | 9/1985 | Weber | 74/866 X |
| 4,760,823 | 8/1988 | Yasuoka et al. | 74/860 X |
| 4,819,596 | 4/1989 | Yasuoka et al. | 74/860 X |
| 4,838,126 | 6/1989 | Wilfinger et al. | 74/866 X |
| 5,157,608 | 10/1992 | Sankpal et al. | 74/866 X |

*Primary Examiner*—Leslie A. Braun
*Assistant Examiner*—Daniel Wittels
*Attorney, Agent, or Firm*—Mark A. Navarre

[57] ABSTRACT

In a motor vehicle power train including a fuel injected internal combustion engine and a hydraulic automatic transmission, an improved engine fueling control strategy for maintaining proper engine RPM in the presence of an automatic transmission Park or Neutral (P/N) to Drive or Reverse (D/R) range shifting. Communication between the Engine and Transmission Control Modules enables precise anticipation of rapid engine intake manifold absolute pressure (MAP) increases associated with P/N to D/R range shifting. Additional fuel is injected immediately preceding the MAP increase in order to maintain the proper engine air/fuel ratio necessary to prevent RPM sags and engine stalls during the clutch engagement. Once the clutch engagement is complete, the additional fuel is progressively eliminated.

5 Claims, 4 Drawing Sheets

ENGINE IDLE FUEL CONTROL DURING TRANSMISSION RANGE SHIFTING

This invention relates to an improved motor vehicle engine idle fuel control strategy for maintaining proper engine speed during range shifting of an automatic transmission.

BACKGROUND OF THE INVENTION

When a motor vehicle equipped with a fuel-injected internal combustion engine and an automatic transmission is range-shifted from Park or Neutral (P/N) to Drive or Reverse (D/R) during engine idle, the sudden load on the engine output shaft produces a temporary error in the engine air/fuel (A/F) ratio. This error, in turn, may cause a significant engine speed (RPM) sag or even a stall.

Speed/density fuel injection systems, regulated by an onboard vehicle Engine Control Module (ECM), rely on intake manifold absolute pressure (MAP) and crankshaft rotational speed measurements to calculate the required amount of fuel to inject. FIG. 1 illustrates a typical cylinder intake valve timing event chart for a double-fired fuel-injected engine rotating at a typical idle speed of 800 RPM.

The chart is broken up into intervals of 12.5 msec, which corresponds to the loop time of the ECM fueling program. For convenience, the timing chart interval labeling begins at 0 msec. Each reference pulse corresponds to 180 degrees of crankshaft rotation. MAP is measured at the trailing edge of each reference pulse, while fuel is injected at the trailing edge of alternate reference pulses. The MAP measurement used for fuel calculation for the intake valve event shown occurs at 0 msec. The MAP measurements at 37.5 and 75 msec (not shown) occur too late to be used for fuel calculation for the intake valve event shown at 50 msec.

The ECM performs fuel calculations every 12.5 msec, regardless of engine RPM. Fuel is injected at 37.5 msec based upon the most recent fuel calculation, which took place at 25 msec. Fuel calculations made at 7.5 msec and beyond (not shown) occur too late to be used for fuel injection for the intake valve event shown.

The intake valve event begins at 50 msec and is approximately 50 msec in duration. Once it has ended, no more fuel can be added to that particular cylinder for the upcoming combustion event. An intake valve event for a particular cylinder occurs every 150 msec in a four cylinder engine at 800 RPM.

As can be seen from FIG. 1, 100 msec elapse from the time of the MAP measurement used for fuel calculation to the end of the intake valve event. Any increase in MAP during this time will force additional air into the cylinder without being compensated with the proper amount of fuel, producing an incorrect A/F ratio. This problem is the result of controlling an event-based device (internal combustion engine) with a time-based control system (ECM).

A P/N to D/R range shift applies an additional load to the engine and causes a rapid increase in MAP, requiring additional fuel to maintain the proper A/F ratio for preventing any disruption of engine RPM. Time-based measurements are unable to accurately detect rapid increases in MAP. A/F ratios based upon MAP measurements taken during range shifting will result in an insufficient amount of injected fuel, producing a lean A/F ratio which will further result in RPM sag or an engine stall. This effect is pronounced in control strategies which attempt to run the engine as lean as possible prior to catalytic converter warm-up.

SUMMARY OF THE INVENTION

The present invention is directed to an improved engine idle fuel control utilizing serial communication between the vehicle Transmission Control Module (TCM), which controls the operation of the automatic transmission and the Engine Control Module (ECM) to enable precise anticipation of rapid MAP increases associated with transmission range shifting.

When the transmission range selector is moved from a P/N to D/R position, the TCM engages a torque transmitting device (oncoming clutch) located within the transmission. Clutch engagement occurs after an apply chamber in the oncoming clutch is filled with fluid.

In the execution of this engagement, the TCM determines a time interval (fill time) after which the oncoming clutch should be almost completely full. At the conclusion of this time interval, the TCM sends a signal to the ECM, and the ECM responds by injecting additional fuel to the normally calculated amount in anticipation of the forthcoming clutch engagement and subsequently increased MAP. The additional fuel compensates for the rapidly increased MAP, thereby maintaining the necessary A/F ratio to prevent an RPM disturbance.

The TCM also monitors torque converter turbine speed. A sudden drop in turbine speed after a P/N to D/R shift indicates that the oncoming clutch is completely full and is transmitting the anticipated load to the engine. The TCM thereupon sends a second signal to the ECM indicating that the load has been applied. The ECM responds to this second signal by decaying away the additional fuel that had been injected since it received the first signal from the TCM. The additional fueling is no longer necessary once the load has been fully applied to the engine because future MAP measurements will accurately reflect the additional load. Fuel calculations based upon these MAP measurements will, therefore, be accurate. Only in cases of rapid anticipated MAP increases, such as P/N to D/R range shifting, is fueling required in addition to that calculated based upon MAP measurements.

DETAILED DESCRIPTION OF THE DRAWINGS

Figure 1:
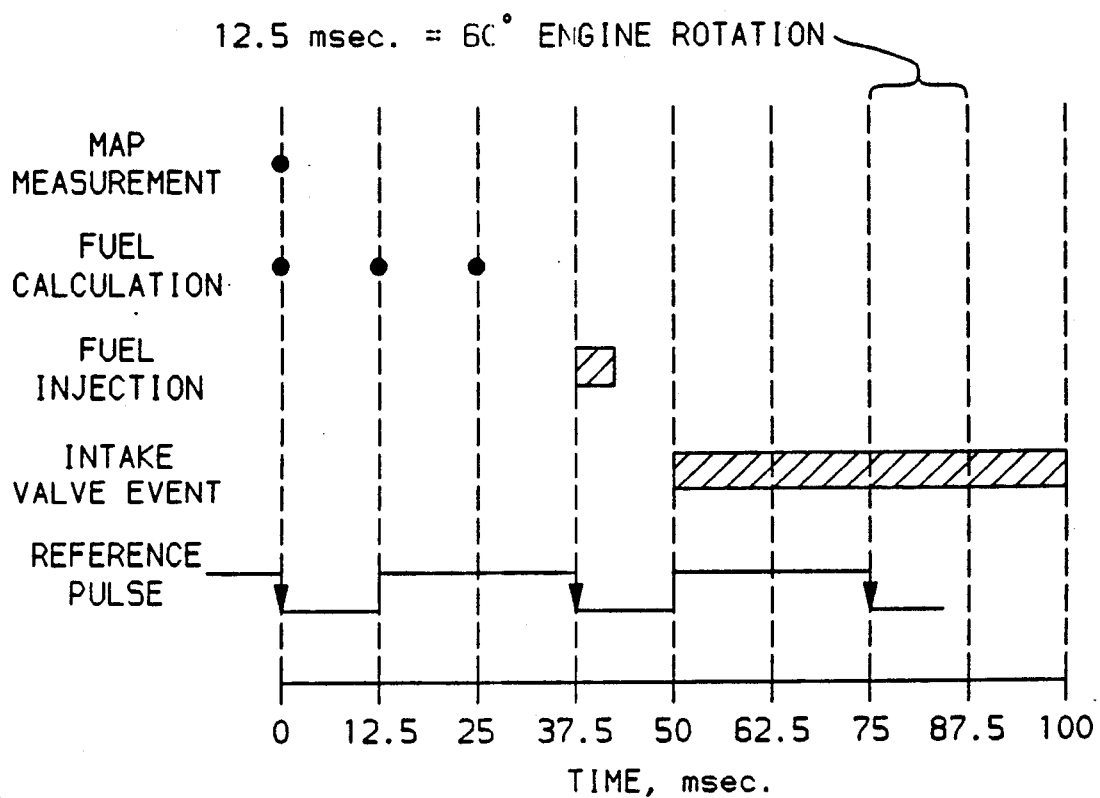
FIG. 1 a cylinder intake valve timing event chart an engine rotating at 800 RPM.
Figure 2:
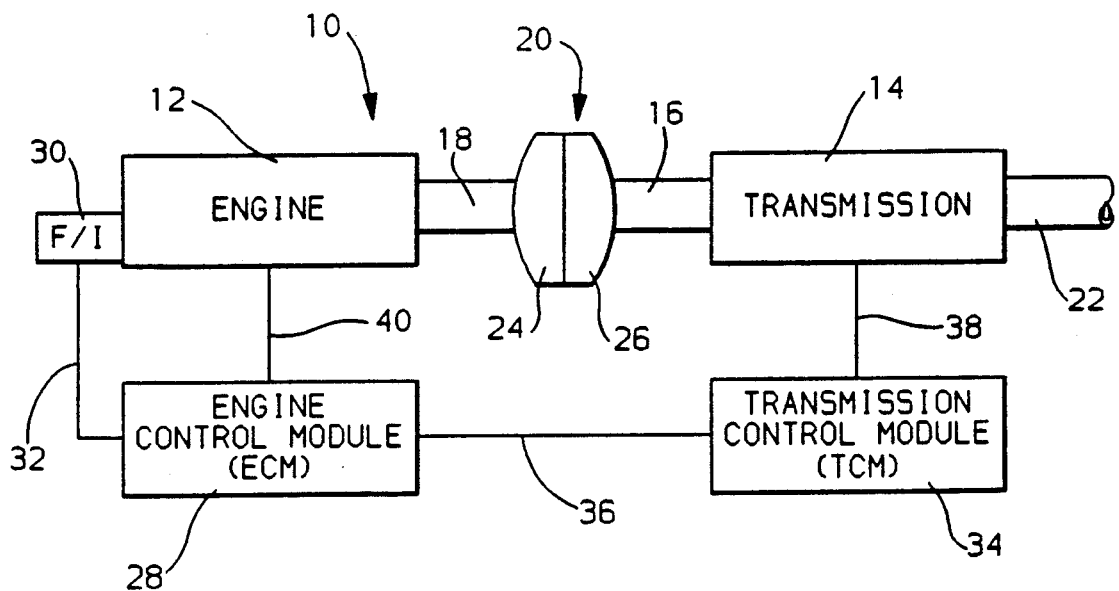
FIG. 2 is a schematic diagram depicting a motor vehicle power train with computer-based Engine and Transmission Control Modules.

Referring to FIG. 2, the reference numeral 10 generally designates a motor vehicle power train comprising a fuel injected internal combustion engine 12, and a conventional hydraulic automatic transmission (TRANS.) 14. The engine 12 drives the input shaft 16 of the transmission via the engine output shaft 18 and torque converter 20. The transmission 14 drives the vehicle wheels (not shown) via the transmission output shaft 22.

The torque converter 20 hydrodynamically couples the engine output shaft 18 to the transmission input shaft 16. The torque converter 20 comprises two halves, a pump half 24 which is connected to the engine output shaft 18 and acts like a centrifugal pump to produce a flow energy from fluid contained within the converter 20, and a turbine half 26 which is connected to the transmission input shaft 16 and converts the flow energy produced by the torque converter pump 24 back into mechanical energy.

The engine control module (ECM) 28 operates as described below in response to various inputs received via line 40 to control the engine air/fuel ratio (A/F) by adjusting the amount of fuel injected by the engine fuel injectors 30, which in turn, are controlled by ECM 28 via line 32.

The transmission control module (TCM) 34 controls and monitors the operation of the transmission 14 via line 38 and communicates with the ECM 28 every 12.5 msec via high speed serial communication line 36. As described below, the TCM 34 supplies inputs to the ECM 28 for control of the engine air/fuel ratio.

When a transmission range selector (not shown) is moved from a Park or Neutral (P/N) position to a Drive or Reverse (D/R) position, the TCM 34 signals the transmission 14 via line 38 to engage the appropriate oncoming clutch (not shown). Engagement is achieved by supplying pressurized fluid to an apply chamber in the oncoming clutch. After the apply chamber is filled, the clutch begins to engage, mechanically coupling the transmission output shaft 22 with the transmission input shaft 16, and thereby permitting the transmission of torque from the engine 12 to the vehicle wheels.

Prior to the engagement of the oncoming clutch, the transmission input shaft 16 rotates at nearly the same speed as the engine output shaft 18. Minimal losses are experienced within the torque converter 20. The transmission output shaft 22 is connected to the vehicle wheels and will have little to no rotation with the transmission 14 in a P/N position. Once the transmission output shaft 22 is coupled with the transmission input shaft 16 via the oncoming clutch, the rotational speed of the transmission input shaft 16 and the turbine 26 is abruptly decreased to a zero or near-zero speed condition. This places a hydrodynamic load on the torque converter pump 24, which load opposes the rotation of the engine output shaft 18. This opposition (load) will cause an increase in the engine intake manifold absolute pressure (MAP), requiring an increase in the amount of fuel injected in the engine 12 to maintain the proper A/F ratio. Failure to compensate the amount of fuel for the increased MAP will result in a lean fuel error causing significant RPM sag with the potential of a complete engine stall.

Figure 3A:
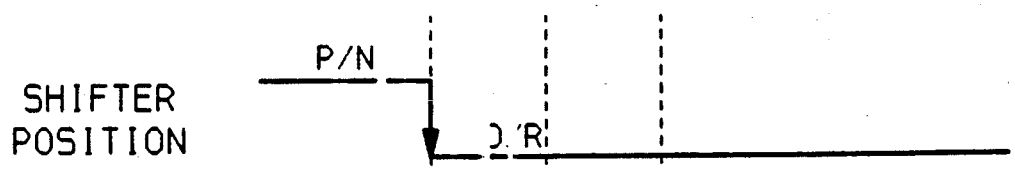
FIG. 3 illustrates a timing chart which depicts the communication between the Engine and Transmission Control Modules of FIG. 2 in carrying out the control functions of this invention.
Figure 3B:
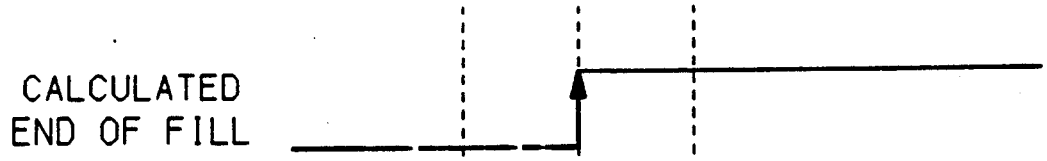
Figure 3C:
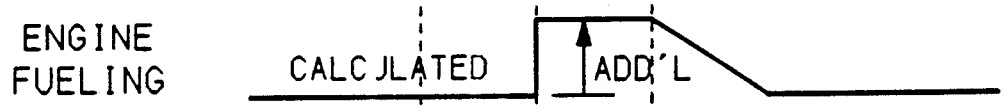

FIGS. 3a-3f illustrate the communications between the TCM 34 and ECM 28 for preventing lean fueling error. When the transmission range selector is shifted from a P/N to D/R position (FIG. 3a), the TCM 34 calculates a time interval (fill time) after which the oncoming clutch is expected to be almost completely full. A signal (FIG. 3b) is sent over line 36 from the TCM 34 to the ECM 28 at the conclusion of this interval. Upon receiving this signal, the ECM 28 increases its calculated fuel injection base pulse width (BPW) in anticipation of the forthcoming clutch engagement (load). By increasing the BPW, additional fuel will be injected into the engine (FIG. 3c).

Figure 3D:
Figure 3E:
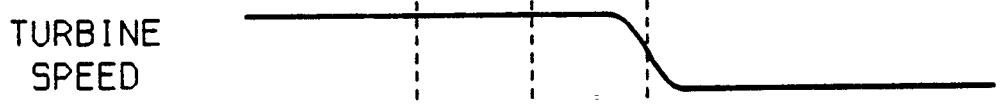
Figure 3F:

As the oncoming clutch becomes filled, it mechanically couples the transmission input and output shafts 16 and 22, respectively, and begins to transmit torque through the transmission 14 (FIG. 3d). The mechanical coupling of the rotating transmission input shaft 16 to the relatively stationary output shaft 22 results in a substantial drop in torque converter turbine speed (FIG. 3e). This drop in turbine speed is sensed by the TCM 34 and interpreted to indicate that the oncoming clutch is completely full. The TCM 34 responds by sending a second signal (FIG. 3f) to the ECM 28 via line 36 indicating that the oncoming clutch is completely full. Upon receiving this signal, the ECM 28 begins to progressively return the increased fuel injection pulse width back to the calculated base pulse width. This reduces the additional engine fueling (FIG. 3c) which is unnecessary once the clutch engagement is completed.

The additional fueling is no longer necessary once the load has been fully applied to the engine because future MAP measurements will accurately reflect the additional load. Fuel calculations based upon these MAP measurements will, therefore, be accurate. Only in cases of rapid anticipated MAP increases, such as P/N to D/R range shifts, is fueling required in addition to that calculated based upon MAP measurements. In such cases, MAP increases too rapidly for the ECM 28 to respond based solely upon time-based MAP measurements.

Figure 4:
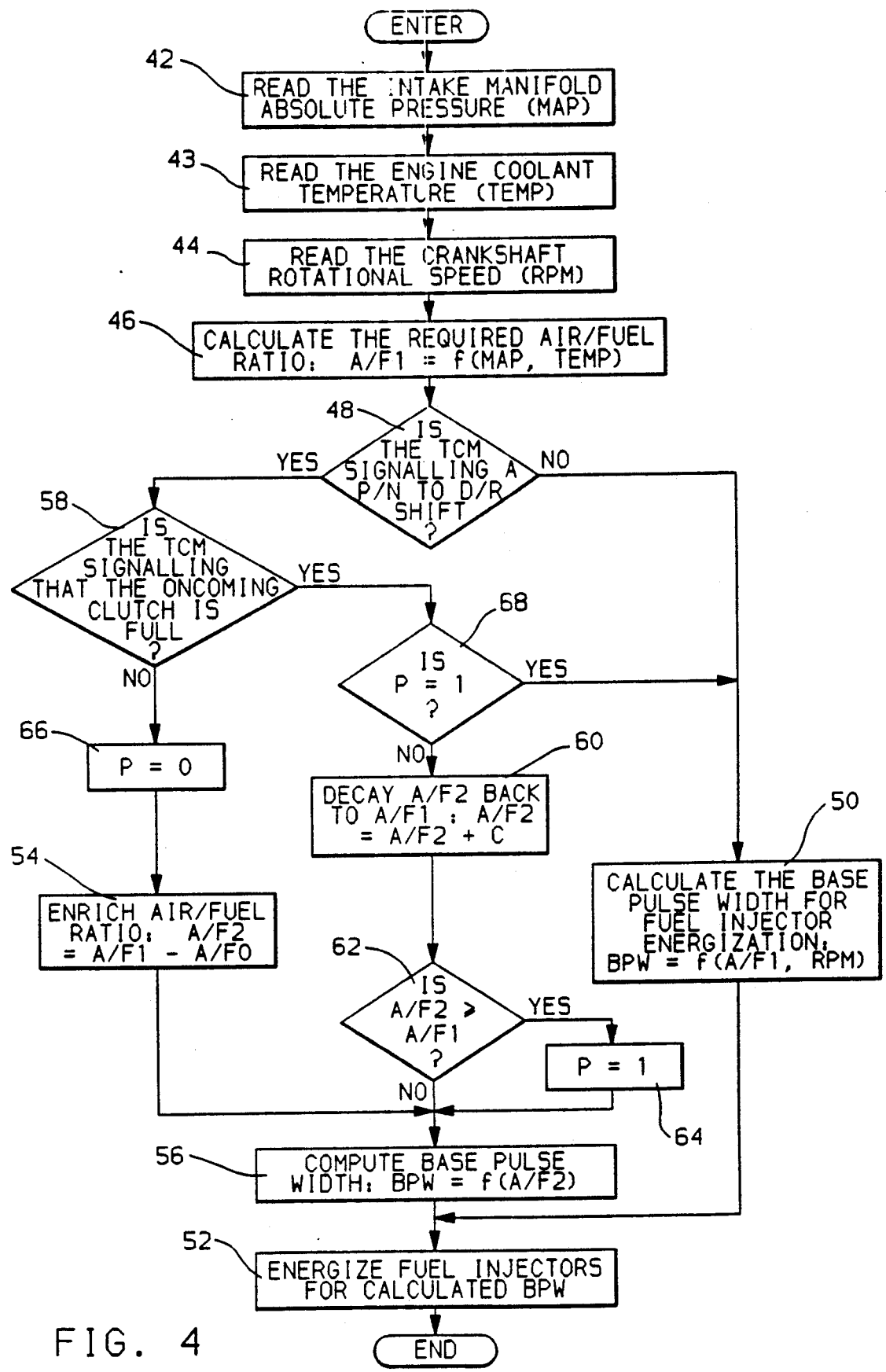
FIG. 4 is a flow diagram representative of computer program instructions executed by the computer-based Engine Control Module of FIG. 2 in carrying out the control functions of this invention.

FIG. 4 illustrates a flow diagram representative of computer program instructions executed by the computer-based Engine Control Module (ECM) of FIG. 2. Each loop through the program represents one firing of the engine fuel injectors 30. The ECM 28, via line 40 of FIG. 2, measures the intake manifold absolute pressure, engine coolant temperature and crankshaft rotational speed in blocks 42, 43 and 44, respectively. In block 46, the required air/fuel ration A/F1 is computed based upon the measured MAP and engine coolant temperature of blocks 42 and 43, respectively.

The program next checks the TCM 34 in decisional block 48 to determine whether there has been a P/N to D/R shift. If not, the previously computed A/F1 ratio in block 46 will be correct and a base pulse width calculation based upon the crankshaft RPM and A/F1 of blocks 44 and 46, respectively, is performed in block 50. Finally, the fuel injectors 30 are energized in block 52, via line 32, for the pulse width as calculated in block 50.

If, however, the TCM 34 had indicated to the ECM 28 in decisional block 48 that a P/N to D/R shift had occurred, the A/F1 ratio as calculated in block 46 would require modification so as to provide for the anticipated additional load and subsequent MAP increase. As noted above, the TCM 34 responds to a P/N to D/R shift by supplying the transmission oncoming clutch with fluid pressure. Once full, the oncoming clutch begins to engage, an is eventually able to transmit the engine torque to the transmission output shaft 22.

During this time, the engine 12 requires additional fuel to maintain the necessary A/F ratio to handle the additional load placed upon the engine output shaft 18.

The ECM 28 responds to a P/N to D/R shift by enriching the A/F1 ratio in block 54. It is important to note that the richer the air/fuel mixture, the lower the A/F ratio because "injected fuel" appears in the denominator of the ratio. The A/F1 ratio is enriched by a predetermined amount, A/F0, based upon the engine coolant temperature measured in block 43. A cooler engine requires more fuel for the same amount of air. The ECM 28 next calculates a base pulse width using the enriched A/F2 ratio of block 56, and the fuel injectors 30 are fired in block 52. Subsequent program executions will look to the TCM 34 in decisional block 58 to determine whether the oncoming clutch is completely full. If not, the enriched A/F2 ratio of block 54 will be maintained.

Once the oncoming clutch is full and completely engaged, the reduced A/F2 ratio of block 54 is no longer needed and it is progressively returned to the A/F1 ratio as calculated in block 46. In block 60, the enriched A/F2 ratio is leaned in increments, each step equal to a predetermined constant, C. As a result, the calculated base pulse width in block 56 will continue to decrease, shortening the energization of the fuel injectors in block 52 and thereby lessening the amount of fuel injected. Decisional block 62 permits the continual decay of the enriched A/F2 ratio until it reaches the A/F1 ratio calculated in block 46. Blocks 64, 66 and 68 are included to ensure that subsequent executions of the program will energize the fuel injectors 30 in block 52 based upon the base pulse width calculated in block 50 using the A/F1 ratio of block 46.

Figure 5:
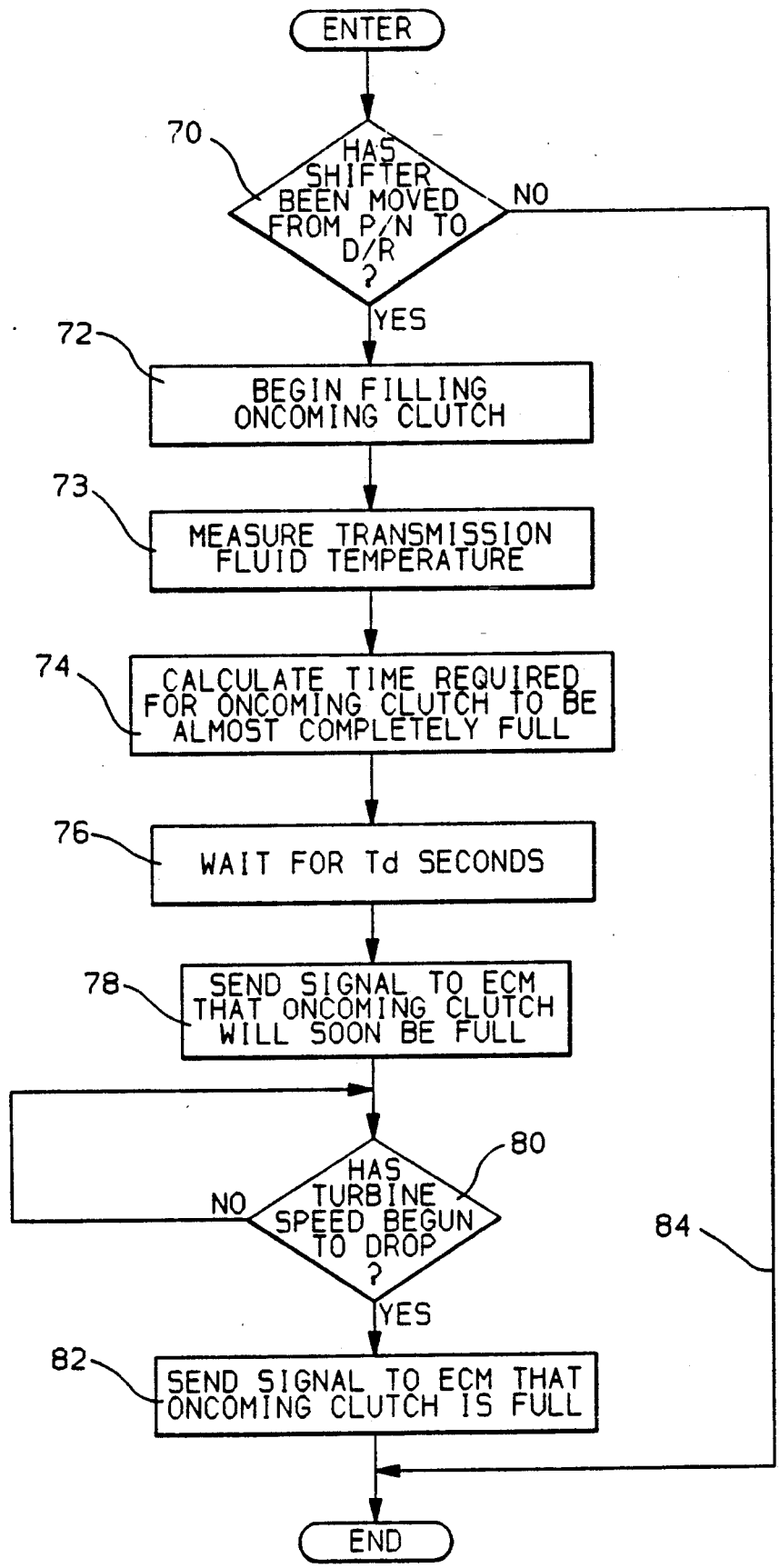
FIG. 5 is a flow diagram representative of computer program instructions executed by the computer-based Transmission Control Module of FIG. 2 in carrying out the control functions of this invention.

FIG. 5 illustrates a flow diagram representative of computer program instructions executed by the computer-based Transmission Control Module (TCM) of FIG. 2. In decisional block 70, the TCM 34 senses whether the range selector has been moved to initiate a P/N to D/R range shift. If not, the routine is exited, as noted by line 84. If so, the TCM 34 responds by instructing the transmission 14 in block 72 to begin filling the appropriate oncoming clutching device.

Transmission fluid temperature is measured in block 73 and used in block 74 to calculate a timing event when the oncoming clutch is expected to be almost completely full. This calculation is only an approximation since the time it actually takes to fill the oncoming clutch is dependent upon several variables such as clutch wear and manufacturing variations within specified tolerances. At the conclusion of the timing event in block 76, the TCM 34 sends a signal to the ECM 28 in block 78 that the oncoming clutch will soon be full. This signal is used by the ECM 28 in block 48 of FIG. 4 to begin adding additional fuel.

In decisional block 80, the TCM 34 continuously monitors the torque converter turbine speed to determine when the oncoming clutch is completely full. Shortly after the end of fill, the turbine speed will experience a significant drop as noted above. Upon sensing the drop in turbine speed, the TCM 34 will send a second signal to the ECM 28 in block 82 that the oncoming clutch is full. This signal is used by the ECM 28 in block 58 of FIG. 4 to begin decaying the additional fuel supplied in response to the first TCM signal of block 78.

In the above manner, the A/F ratio of engine 12 is controlled during a transmission P/N to D/R range shift to provide adequate fuel for added engine load and increased intake manifold absolute pressure caused by the clutch engagement within the transmission. As a result, RPM sags and engine stalls associated with P/N to D/R range shifts are eliminated.

While this invention has been described in relation to the illustrated embodiment, it is expected that various modifications thereto will occur to those skilled in the art. For example, the functions performed by the ECM 28 and TCM 34 could be performed by a single power train control module (PCM). In this regard, it should be understood that controls incorporating such modifications may fall within the scope of this invention which is defined by the appended claims.

The embodiments of the invention in which an exclusive property or privilege is claimed are defined as follows:

1. In a motor vehicle including a fuel-injected engine and an automatic shift transmission having a fluid-operated torque transmitting device which is filled in preparation for engagement and then engaged to establish a vehicle drive condition in response to movement of a driver-operated range selector, a method of operation which avoids engine speed disturbances associated with the establishment of said vehicle drive condition, comprising the steps of:
   injecting a calculated amount of fuel into said engine in accordance with a measured engine load parameter;
   generating a first signal when said torque transmitting device is expected to be completely filled;
   increasing said calculated amount of injected fuel to an increased amount in response to the generation of said first signal;
   generating a second signal upon engagement of said torque-transmitting device; and
   reducing the amount of injected fuel from said increased amount to said calculated amount in response to the generation of said second signal.

2. The method set forth in Claim 1, wherein the step of generating said first signal comprises the steps of:
   measuring a fluid temperature of said automatic transmission;
   determining a time required for said torque-transmitting device to be almost completely full based upon said measured fluid temperature; and
   generating said first signal at the expiration of said determined time.

3. The method set forth in claim 1, wherein said engine is coupled to said transmission by an hydraulic torque converter having a pump mechanically coupled to an output shaft of said engine and a turbine mechanically coupled to an input shaft of said transmission, and the step of generating said second signal comprises the steps of:
   measuring a rotational speed of said turbine; and
   generating said second signal after a predetermined drop in said measured rotational speed of said turbine.

4. The method of operation set forth in claim 1, wherein the increased amount of fuel is determined in relation to a measured engine temperature.

5. The method of operation set forth in claim 1, wherein the step of reducing the amount of injected fuel comprises the step of periodically reducing the amount of injected fuel until such amount reaches said calculated amount of fuel.

* * * * *